(12) United States Patent
Hsieh

(10) Patent No.: US 6,604,868 B2
(45) Date of Patent: Aug. 12, 2003

(54) MICROPROCESSOR-CONTROLLED SERVO DEVICE FOR CARRYING AND MOVING CAMERA

(76) Inventor: Kent Hsieh, 7F-6, No. 35, Hsin-Tai Rd., Chupei City, Hsinchu (TW)

( * ) Notice: Subject to any disclaimer, the term of this patent is extended or adjusted under 35 U.S.C. 154(b) by 0 days.

(21) Appl. No.: 09/871,957

(22) Filed: Jun. 4, 2001

(65) Prior Publication Data

US 2002/0181955 A1 Dec. 5, 2002

(51) Int. Cl.$^7$ .............................................. G03B 17/00
(52) U.S. Cl. ...................................... 396/419; 396/428
(58) Field of Search ................................. 396/428, 419; 348/207.11, 211.89, 211.4, 373

(56) References Cited

U.S. PATENT DOCUMENTS

| | | | | |
|---|---|---|---|---|
| 3,561,343 A | * | 2/1971 | Plummer | 396/428 |
| 3,638,502 A | * | 2/1972 | Leavitt et al. | 74/5.34 |
| 4,351,187 A | * | 9/1982 | Foulks et al. | 73/178 R |
| 4,752,791 A | * | 6/1988 | Allred | 410/101 |
| 4,847,543 A | * | 7/1989 | Fellinger | 318/12 |
| 5,457,370 A | * | 10/1995 | Edwards | 318/571 |
| 5,463,432 A | * | 10/1995 | Kahn | 352/243 |
| 5,579,071 A | * | 11/1996 | Wetzel et al. | 352/243 |
| 5,590,955 A | * | 1/1997 | Bornhorst et al. | 362/324 |
| 5,802,412 A | * | 9/1998 | Kahn | 396/427 |
| 6,011,925 A | * | 1/2000 | Hosoe | 396/427 |
| 6,477,918 B2 | * | 11/2002 | Sakamoto | 74/640 |

* cited by examiner

Primary Examiner—Russell Adams
Assistant Examiner—Michelle Nguyen
(74) Attorney, Agent, or Firm—Rosenberg, Klein & Lee

(57) ABSTRACT

A microprocessor controlled servo device for carrying and driving a camera, comprises a microprocessor chip processing control circuit, an I/O port, and a servo set. A user operates a keyboard to input a control signal input command and a control signal input termination command. The microprocessor reads the related program and data stored in a memory then inputs a corresponding control pulse signal to a servo set after control processing, and drives a servo to rotate after comparison and amplification. The servo set comprises two driving circuit servos that control and move a camera horizontally and vertically. The servos carry and move the camera in order to perform functions of camera monitoring, such as location memorizing of a plurality of preset points, cruise scanning, alarm output, and automatic tracking. The user can see whether the input command is correct and to monitor system execution by means of an LCD. The device can perform tracking photography and emit an alarm immediately through the control of input termination when an abnormal situation occurs.

9 Claims, 4 Drawing Sheets

| SPD:03 |

Scanning speed Range 1~30

| STEP 01 |

The Preset Display

| H:0075 |

Horizontal Display 1~1400

| V:1400 |

Vertical Display 1~1400

| C1 RANGE:1-00 DLY:03<br>STEP 01 H:0075 V:1400 |

Display Panel

C1:CAMERA NO.1
C2:CAMERA NO.2
C3:CAMERA NO.3
C4:CAMERA NO.4

| C1 |

Cameras Number 1~4

| RANGE:1-00 |

Preset Step Range 1~99

| DLY:03 |

Preset Delay Timer 1~99Sec.

FIG.3(B)

MICROPROCESSOR-CONTROLLED SERVO DEVICE FOR CARRYING AND MOVING CAMERA

TECHNICAL FIELD

The present invention relates to a microprocessor-controlled servo device for holding, carrying, and moving a camera, and more particularly to a device, which comprises a microprocessor chip processing control circuit, and I/O port and a servo set, for controlling and moving a camera.

BACKGROUND OF THE PRESENT INVENTION

Two kinds of servomotors available on the market are AC or DC servomotors for industrial automation and radio controlled DC servomotors. The structure and control of industrial servomotors is complicated, for the reason that the control accuracy requirement is high. Even a standard normal class needs 1 mm accuracy. When such kind of motor is used for carrying and moving a camera, the occupied space is relatively large and the cost is high. The operation and settings depend on professionals and use and maintenance is relatively complicated. The photographing angle of a normal camera with a standard lens is at a vision angle of 40 to 50 degrees at most. But even a difference in vision angle of 100 mm in the image taken by the above-mentioned camera is not very important. The usual field of application for the industrial servomotor is in industrial automated precision mechanical facilities, and not in camera monitoring.

A servomotor used by a normal radio controlled toy is used in such things as a radio controlled airplane, boat or car. Such kind of servomotor comprises an input control signal, driving amplification circuit, DC motor and potentiometer. The input control signal is a positive pulse control signal emitted from a radio transmitter operated by a user. The frequency range is approximately 27 MHz or 40 MHz according to the country and the area. The driving amplification circuit is manufactured into an IC in most products made by advanced countries such as the United States, Japan and Germany. The driving amplification circuit receives the positive pulse control signal transmitted from the radio transmitter and drives a DC motor to take a forward or backward rotation or to stop after a comparison operation. The motions of the servomotor are of only three types: forward rotation, backward rotation, and stop. The forward and backward rotations must be processed by using an operator's hand to move an operating shaft constructed with the potentiometer back and forth. The servomotor rotates forward when the shaft is moved forward, and rotates backward when it is moved backward. The shaft automatically springs back to the middle position when the operator takes their hand away, and the servomotor stops. Its motion is simple enough to be fit for using for the operation of a normal manual remote controlled toy. Also, because its motion is too simple, the function thereof is not enough for practical use to be used for moving a camera in order to perform circumstance monitoring. Therefore, it must be revised. Moreover, the rotating angle of its forward and backward rotations is limited by the structure of the servomotor. The largest rotating angle it can rotate is 60 degrees or so. Such kind of angle ranges can be utilized flexibly in the field of radio controlled toys, but it will obviously form a dead angle in camera monitoring owing the deficiency in the rotating angle of the camera when used for carrying and moving a camera. Because the monitoring operation is manual instead of automatic, it is difficult to apply in practical use.

Another radio controlled servomotor is available now which comprises a DC motor, a deceleration gear set, a potentiometer and a driving circuit. The main shaft of the DC motor is connected with the rotating shaft by means of a gear set. The rotation of the DC motor also drives the potentiometer to rotate. The rotating shaft of the potentiometer is lengthened to extend out to be taken as a loading main rotating shaft of the servomotor. Therefore, for the reason that the loading main rotating shaft is limited to both the rotating angle range of the potentiometer and the rotation structure of the potentiometer itself, it has a limited rotation range, i.e. the total rotating angle is about 120 degrees. Consequently, it is quite difficult to expand the rotating angle range of the DC motor to be twice thereof or even close to 360 degrees. The radio controlled servomotor can only be used in toys and is in no way to be used for carrying and moving cameras. It has two deficiencies in practical use. One is that the motions that can be operated are of only three kinds: forward rotation, backward rotation, and stop. These motions must be made manually. Another deficiency is owing to the deficiency of the rotation structure of the potentiometer itself, which causes the total rotating angle plus approximately 10% error to be only about 120 degrees. It has no way of effectively conquering the dead angle for camera monitoring.

Thus, it can be seen that the use of the above-mentioned traditional art servomotor applications are not effective or convenient for carrying and moving a camera in order to perform camera monitoring. Therefore, improvement is necessary.

SUMMARY OF THE PRESENT INVENTION

An object of the present invention is to provide a camera with a function memorizing a plurality of preset point positions. This enables the camera to automatically jump to do tracking photography from a first position point to an nth position point in sequence according to the preset time period when the microprocessor control processing system receives "a plurality of preset points automatic tracking" command. The preset time can be input and set by an input control button.

Another object of the present invention is to provide a camera with a function for memorizing a position after the position is correctly adjusted. This enables the camera to take a forward rotation or backward rotation whenever necessary to as to choose locations that need to be photographed, when the microprocessor control processing system receives "forward rotation" or "backward rotation" commands.

Still another object of the present invention is to provide a camera with a function that can memorize the N positions after the positions are adjusted correctly. The camera can memorize N memory points of the present positions at any time through the operation function selection of the input control and memory button, when the microprocessor control processing system receives a "memory" command.

Another object of the present invention is to provide a low-speed tour programming function. This enables the camera to process the motion tour programming camera monitoring from a first to an nth memory location point according to the preset programming speed in the preset N memory position points, when the microprocessor control processing system receives a "programming" command.

Another object of the present invention is to provide a function for abnormality invasion. The camera can automatically track to the position point of preset memory designated by a termination input function and lock on the target in order to process photographing and emit alarms signals when the microprocessor control processing system receives a "termination emergency input" command.

Another object of the present invention is to provide a display, such as an LCD, enabling an operator to see whether the input commands and data are correct and to monitor the system execution states.

The present invention utilizes at least two methods to overcome the disadvantages of the prior art. One is to use a microprocessor processing control system to generate a corresponding control signal. Another is to use an improved servo set.

The microprocessor single chip processing control system of the present invention comprises single chip control circuits and corresponding software. The single chip control circuit also has a supply power and clock pulse generating circuit needed for the single chip. It comprises an input signal operating keyboard, a single chip, memory, an LCD and I/O ports. Its function is to generate a corresponding control pulse signal automatically. The corresponding software program, mainly stores corresponding data about locating positions of the deceleration DC motor of the servo set and the program executing a series of commands into the memory. A rotation range so that the deceleration DC motor rotates 360 degrees effectively is L. L is divided into N equal parts. Each different equal part has a corresponding control pulse signal as it representation. The pulse widths T for all pulse signals are different. For example, a pulse width corresponding to the first starting point position Ls of the effective range L, is Ts. A pulse width corresponding to the middle point position Lm of the range L, is Tm. And a pulse width corresponding to the end position Le, is Te.

For an example, in a preferred embodiment of the present invention, the whole range is Cut into 1400 equal parts so the corresponding 1400 different pulse widths, T*1400, will be stored in the memory. When an operator inputs an input signal or external termination control signal, the microprocessor chip will read the relative data input into memory. The input control pulse width must be in the opposite direction with the pulse width of the reference pulse signal generated by the servo set so as to add their difference and output the differential pulse width. The description concerning the differential pulse width on the rotation servo will be described later.

The servo set comprises two servos, which rotate horizontally and perpendicularly respectively. One of them holds and moves a camera. Each servo comprises a deceleration DC motor, a meshing gear set, a motor main shaft, a potentiometer and a driving circuit. The main shaft of the deceleration DC motor and the rotating shaft are connected by the meshing gear set. This enables the deceleration DC motor to drive the potentiometer to rotate. In order to let the rotating angle of the deceleration DC motor to be larger than the angle of the rotation range of the potentiometer, the teeth number of the meshing gear meshed with the main shaft of the motor is larger than the teeth number of the meshing gear meshed with the rotating shaft of the potentiometer. In other words, when the motor rotates a unit distance, the rotation of the potentiometer is smaller than the unit distance. Therefore, it enables the motor to rotate larger than or equal to 360 degrees, and not to be limited to the mechanical structure limitations of the potentiometer which makes the rotation absolutely smaller than 360 degrees.

The following describes how the differential pulse width signal influences the rotation of the servo. Each servo moreover pairs with a set of driving circuits. The driving circuit comprises a pulse comparator, a pulse amplifier, a motor driver, and a reference pulse signal generator. The function is that when a control pulse signal generated from the microprocessor chip processing control circuit is input, the reference pulse signal generator is triggered to generate a reference pulse signal in the opposite direction with the control pulse signal. After the pulse widths of these two pulses are compared in the pulse comparator, a differential pulse width signal, that is the difference between them, is generated. If the differential pulse width is a positive pulse width, the deceleration DC motor takes a forward rotation through the driving amplification of the driving amplification circuit. Alternatively, if the differential pulse width is a negative pulse width, the deceleration DC motor takes a backward rotation through the driving amplification of the driving amplification circuit. If the differential pulse width is equal to zero, it means that the two pulse widths are equal, and no signal is processed in the driving amplification circuit, then the DC motor will stop rotating.

The camera driven and moved by the device of the present invention, provides a camera monitoring capable of position memory, tour programming, alarm output, and automatic tracking.

The LCD display can let an operator see whether the input commands and data are correct and monitor system execution states.

BRIEF DESCRIPTION OF THE DRAWINGS

FIG. 3B is a block diagram of an LCD function display according to an embodiment of the present invention.

DETAILED DESCRIPTION OF THE PREFERRED EMBODIMENTS

Figure 1:
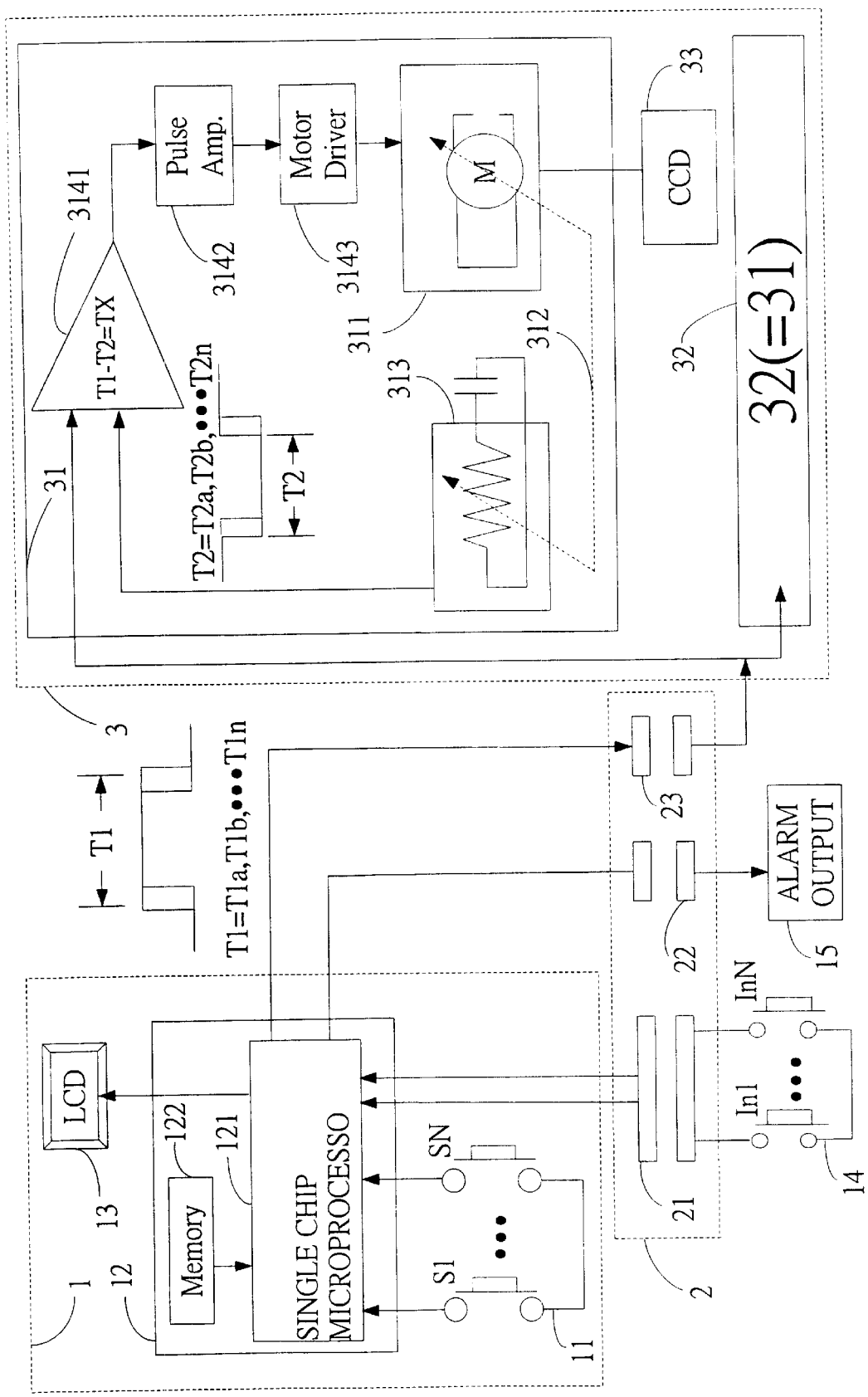
FIG. 1 is a block diagram showing the principles of a servo device for microprocessor controlled carrying and moving a camera according to an embodiment of the present invention.
Figure 2:
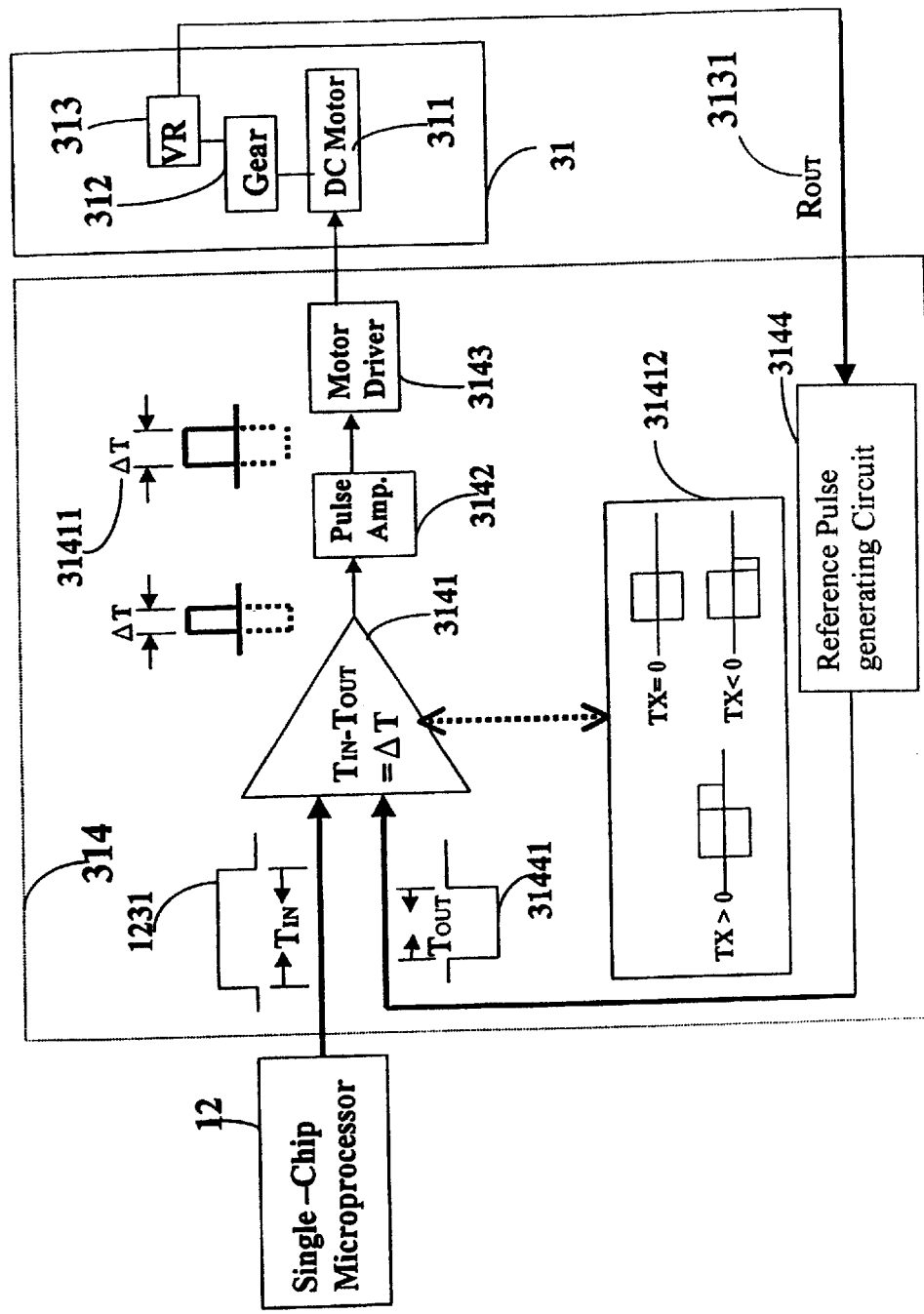
FIG. 2 is a block diagram showing a pulse comparison and mathematical operation according to an embodiment of the present invention.

Referring to FIG. 1 and FIG. 2, a servo device of a microprocessor controlled and driven camera mainly comprises a microprocessor single-chip process and control circuit 1, three input/output interfaces 2, and a servo module 3. The microprocessor single-chip process and control circuit 1 comprises an input control signal 11, a single chip 121, a memory 122, two displacement buffers and an LCD 13.

The three input/output interfaces 2 are an interruption input control signal interface 21 for receiving interrupts In1 . . . InN from an external interrupt 14, an alarm output interface 22 connected to an alarm output 15, and a servo module interface 23.

The servo module 3 comprises two servos 31 and 32 and a camera 33. As the figure shows, the inner structure of the two servos are the same, however one servo is utilized to drive a camera. For this example, the servo 31 is designated as this one servo. The servo 31 comprises a deceleration DC motor 311, a meshing gear set 312, a potentiometer 313 and a driving circuit 314. The driving circuit 314 comprises a comparator 3141, a pulse amplifier 3142, a motor driver 3143, and a reference pulse signal generator 3144. The camera 33 is loaded on the servo 31 of the servo module.

Figure 3A:
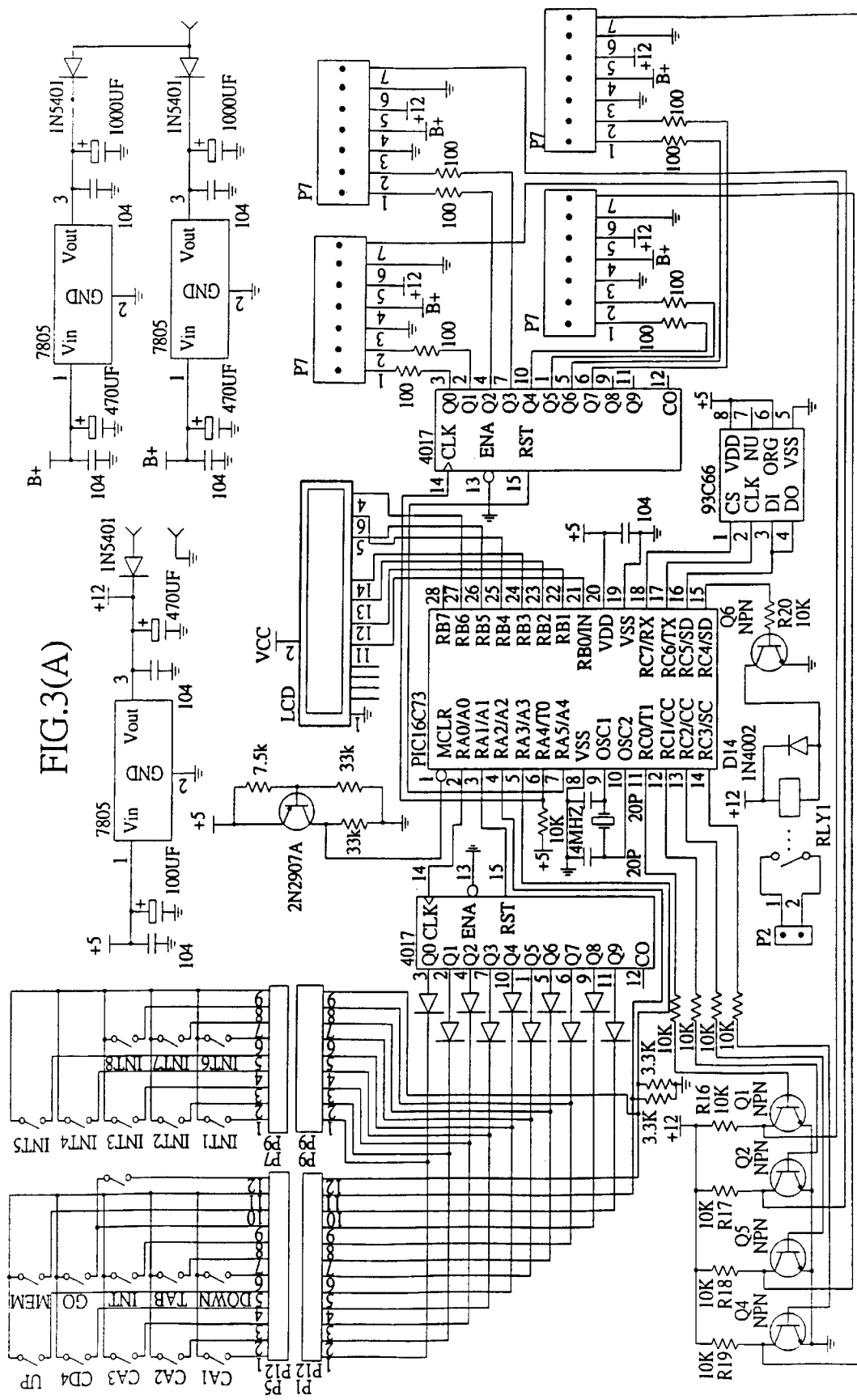
FIG. 3A is a microprocessor chip processing control circuit diagram according to an embodiment of the present invention.

As shown in FIGS. 3A and 3B, after the power for the device of the present invention is on, an operator can use eleven input buttons S1 . . . SN for the input control signal 11. Among them, CA1 through CA4 are four serial number buttons to represent four cameras that the device can control. An "UP" button is utilized to control the deceleration DC motor to take a positive rotation. A "DOWN" button is utilized to control the deceleration DC motor to take a negative rotation. A "TAB" button is utilized to move a cursor that can represent a function item indicator to a next function item. An "INT" button is pressed to set an interruption input parameter. A "GO" button is pressed once to start the execution of the device system and pressed again to stop the execution. A "MEM" button is utilized to input the previously mentioned set parameter to memory. A "SCAN/STEP" button is pressed to start a scanning function and pressed again to start a stepping function. FIG. 3B shows the display regarding the states of the previously mentioned input buttons on an LCD. The LCD has two rows for the display.

There are three function zones shown in the upper row. One is a camera assigned number zone "CX", for example, C1 represents camera number 1. Another function is a preset memory range zone "RANGE", showing preset memory points which can set up to 99 points. Another function is an execution type zone "DLY/SPD", showing a delay time setting range, which can be set from 1 through 99 seconds. This is from one preset memory point to another preset memory point in the automatic preset point tracing function or shows a display of a scanning speed setting which can be set from 1 through 99 seconds for a scanning function.

There are also three function zones shown in the lower row of the LCD. One is an executing preset memory point STEP X. Another is "H: horizontal or positive rotation coordinate indication (horizontal display)". The positive rotation rankle being divided into 1400 equal components in a preferred embodiment. Another function is "V: vertical or negative rotation coordinate indication (vertical display)". The negative rotation range being divided into 1400 equal components in a preferred embodiment.

The digits and data shown on the LDC display are all stored in an Electrically Erasable Programmable Read-Only Memory, EEPROM. The preset parameter values will not disappear even after power is cut, meaning the data will be shown on the LCD when the computer is restarted.

Refer again to FIGS. 1 and 2. For convenience and brevity, only one commonly used button "UP" is used as an example to explain how the input control circuit works. After the device is started and the "UP" button is pressed, the device system will execute the work according to the former preset parameters condition. When the "UP" button is pressed, the input displacement buffer will scan the signal of the "UP" button. Then, the single chip 121 of the microprocessor invokes a relative subprogram and reads the relative data T1 of the memory 122. After these processes, a positive control pulse signal 1231 will be output by means of the output interface 23 to one input of the pulse comparator 3141 of the driving amplification circuit 314.

The other input of the comparator 3141 is a reference negative pulse 31441 output by the reference pulse generator 3144 of the servo 31. The comparator 3141 processes the add comparison of the pulse widths of these two pulses. If the difference pulse width $\Delta T$ of the additive result of the positive pulse width 1231 and the negative pulse width 31441 is larger than zero, it means that the difference pulse width is positive. After the amplification of the pulse amplifier 3142 and the driving of the motor driver 3143, the deceleration DC motor 311 takes a forward rotation. When the deceleration motor 311 is taking a forward rotation, it drives the meshing gear set 312 to these a forward rotation. The rotation will cause the resistance R value of the original potentiometer setting to increase a unit to become R+1 so that the reference pulse generator will generate a bigger negative reference pulse width (resistance value R*static capacity C=time pulse width T) to enter comparator 3141 to continue comparison operation. If a positive difference is still generated, i.e. $\Delta T>0$, the rotation result of the motor 311 and the potentiometer 313 will generate a bigger value of (R+1)+1 resistance value. It will generate a bigger T2$b$ to compare with the positive control pulse width. This operation is repeated again and again until the pulse widths are both the same, i.e. $\Delta T=0$. The zero difference pulse is amplified to be no signal to the motor driver 3143 by the pulse width amplifier 3142 and the motor 311 will stop rotating.

If the operator keeps pressing the "UP" button and doesn't release it, the judgment result will cause an original relative value T1$a$ to add 1 to become a bigger value T1$b$, enabling T1$a$, T1$b$ . . . T1$n$ to continue to generate a larger value of positive control pulse, where T1$a$<T1$b$, T1$b$<T1$c$, etc. Then a bigger value of control pulse width signal is output to the comparator by means of the output adapter port. This will change the original condition $\Delta T=0$ to become $\Delta T>0$. The positive difference pulse width causes the motor 311 to rotate positively again and its potentiometer will also rotate positively again.

Therefore, due to the continuous positive rotation of the potentiometer 313, a series of different resistance impedance values T2$a$, T2$b$, T2$c$, . . . T2$n$, wherein T2$a$<T2$b$, T2$b$<T2$c$, . . . So a different resistance will generate a bigger value of negative reference pulse width T2$c$ again and continue to enter the comparator 3141 for comparison. This is repeated again and again, enabling the difference pulse width $\Delta T n$ of the addition comparison result every time to be positive. This causes the deceleration DC motor to rotate positively until the user releases the "UP" button, or until the motor rotates to its limit.

Likewise, the deceleration DC motor 311 will take a reverse rotation when the "DOWN" button is pressed.

When the "TAB" button is pressed, a displacement mark point cursor will be shown on the LCD screen. The displacement mark point will move from each function indication zone to a next zone every time it is pressed. The zone that the displacement mark point locates means the zone that the function thereof can be executed at present. For an example, when the displacement mark point is moved to the x coordinate function zone on the monitor, pressing "UP", the x coordinate value will be increase successively. Meanwhile, the servo that represents the horizontal rotating direction of the x-axis takes a positive rotation. Likewise, when the displacement mark point is moved to the y coordinate function zone on the monitor, pressing the "FORWARD" button, the y coordinate value will be increased successively. Meanwhile, the servo that represents the vertical rotating direction of the y-axis takes a positive rotation.

The above disclosure is not intended to be limiting. Those skilled in the art will readily observe that numerous modifications and alternatives of the device may be made while retaining the teachings of the invention. Accordingly, the above disclosure should be construed as limited only by the metes and bounds of the appended claims.

What is claimed is:

1. A servo device for controlling and driving a camera, comprising:
   a microprocessor processing control circuit for generating a control pulse signal;
   a potentiometer for providing a reference signal;
   a deceleration DC motor for moving the camera connected to the deceleration DC motor;
   a gear set for connecting the deceleration DC motor to the potentiometer;
   whereby the gear set allows the deceleration DC motor to rotate more than 360 degrees; and
   a comparator for comparing the control pulse signal and the reference signal and outputting a drive signal;
   whereby, if the control pulse signal is larger than the reference signal, the drive signal will cause the deceleration DC motor to rotate in a forward direction;
   whereby, if the control pulse signal is smaller than the reference signal, the drive signal will cause the deceleration DC motor to rotate in a backward direction; and
   whereby, if the control pulse signal is equal to the reference signal, the drive signal will cause the deceleration DC motor to stop.

2. The servo device of claim 1, wherein the microprocessor processing control circuit further comprises a display for displaying data values, preset memory points, tour time, tour range, and rotating speed of the camera.

3. The servo device of claim 2, wherein the microprocessor processing control circuit further comprises a keyboard for inputting data and control commands.

4. The servo device of claim 3, wherein the servo device further comprises an interrupt signal input port for receiving an interrupt signal and an alarm output port for outputting an alarm signal.

5. A servo device for controlling and driving a camera, comprising:
   a microprocessor processing control circuit for generating a first and second control pulse signal;
   a first potentiometer for providing a first reference signal;
   a second potentiometer for providing a second reference signal;
   a first deceleration DC motor for rotating the camera in a horizontal direction;
   a second deceleration DC motor for rotating the camera in a vertical direction;
   a first gear set for connecting the first deceleration DC motor to the first potentiometer;
   whereby the first gear set allows the deceleration DC motor to rotate more than 360 degrees;
   a second gear set for connecting the second deceleration DC motor to the second potentiometer;
   a first comparator for comparing the first control pulse signal and the first reference signal and outputting a first drive signal;
   whereby, if the first control pulse signal is larger than the first reference signal, the first drive signal will cause the first deceleration DC motor to rotate in a forward direction;
   whereby, if the first control pulse signal is smaller than the first reference signal, the first drive signal will cause the first deceleration DC motor to rotate in a backward direction; and
   whereby, if the first control pulse signal is equal to the first reference signal, the first drive signal will cause the first deceleration DC motor to stop;
   a second comparator for comparing the second control pulse signal and the second reference signal and outputting a second drive signal;
   whereby, if the second control pulse signal is larger than the second reference signal, the second drive signal will cause the second deceleration DC motor to rotate in a forward direction;
   whereby, if the second control pulse signal is smaller than the second reference signal, the second drive signal will cause the second deceleration DC motor to rotate in a backward direction; and
   whereby, if the second control pulse signal is equal to the second reference signal, the second drive signal will cause the second deceleration DC motor to stop.

6. The servo device of claim 5, wherein the microprocessor processing control circuit further comprises a display for displaying data values, preset memory points, tour time, tour range, and rotating speed of the camera.

7. The servo device of claim 6, wherein the microprocessor processing control circuit further comprises a keyboard for inputting data and control commands.

8. The servo device of claim 7, wherein the servo device further comprises an interrupt signal input port for receiving an interrupt signal and an alarm output port for output an alarm signal.

9. A servo device for controlling and driving a camera, comprising:
   a microprocessor processing control circuit comprising;
      a single chip control circuit for generating a first and second control pulse signal comprising;
         a keyboard operating input signal for inputting data and control commands;
         a single chip for processing data;
         a memory for storing data;
         a display for displaying data values, preset memory points, tour time, tour range, and rotating speed of the camera;
         an interrupt signal input port for receiving an interrupt signal;
         an alarm output port for output an alarm signal; and
         a software program for storing data for locating positions of camera, and a main program and subroutine programs to be processed by the single chip;
   a servo set comprising;
      a first servo rotating in a horizontal direction, the first servo comprising;
         a first deceleration DC motor;
         a first motor main shaft connected to the first deceleration DC motor;
         a first potentiometer;
         a first meshing gear set comprising;
            a first gear engaging with the first motor main shaft; and
            a second gear meshing with the first potentiometer;
         a first driving circuit for receiving a first control pulse signal;
         wherein, the first motor main shaft engages with the first meshing gear set enabling the first deceleration DC motor to drive the first potentiometer to rotate; and a second servo rotating in a vertical direction, the second servo comprising;
   a second deceleration DC motor;
   a second motor main shaft connected to the second deceleration DC motor;
   a second potentiometer;
a second meshing gear set comprising;
   a third gear engaging with the second motor main shaft; and
   a fourth gear meshing with the second potentiometer;
a second driving circuit for receiving a second control pulse signal;

wherein, the second motor main shaft engages with the second meshing gear set enabling the second deceleration DC motor to drive the second potentiometer to rotate; and whereby rotation of the first deceleration DC motor will cause the camera to rotate in a horizontal direction and rotation of the second deceleration DC motor will cause the camera to rotate in a vertical direction.

* * * * *